United States Patent
Cicansky (10) Patent No.: US 7,607,698 B2
(45) Date of Patent: Oct. 27, 2009

(54) MUD GUARD ASSEMBLY

(75) Inventor: Joseph Cicansky, Regina (CA)

(73) Assignee: Cloud - Rider Designs Ltd., Regina (CA)

(*) Notice: Subject to any disclaimer, the term of this patent is extended or adjusted under 35 U.S.C. 154(b) by 183 days.

(21) Appl. No.: 11/746,865

(22) Filed: May 10, 2007

(65) Prior Publication Data

US 2008/0277895 A1 Nov. 13, 2008

(51) Int. Cl.
*B62B 9/16* (2006.01)
(52) U.S. Cl. ............................ 280/851; 280/154
(58) Field of Classification Search ................ 280/154, 280/157, 848, 851
See application file for complete search history.

(56) References Cited

U.S. PATENT DOCUMENTS

| | | | | |
|---|---|---|---|---|
| 3,650,543 A | * | 3/1972 | Evans | 280/851 |
| 5,044,667 A | * | 9/1991 | Manning | 280/851 |
| 5,269,547 A | * | 12/1993 | Antekeier | 280/154 |
| 5,460,412 A | * | 10/1995 | Vincent et al. | 280/851 |
| 5,833,254 A | * | 11/1998 | Bucho | 280/154 |
| 6,394,475 B1 | | 5/2002 | Simon | |
| 6,485,059 B2 | | 11/2002 | Burnstein | |
| 6,955,369 B1 | | 10/2005 | Schiebout et al. | |

* cited by examiner

*Primary Examiner*—Jeffrey J Restifo
*Assistant Examiner*—Bridget Avery
(74) *Attorney, Agent, or Firm*—Ade & Company Inc; Ryan W. Dupuis; Kyle R. Satterthwaite (57) ABSTRACT

A mud guard assembly for towing vehicle includes fixed channels spanning laterally across a rear end of the vehicle, supported in fixed relation on chassis mounts of the vehicle which support the rear bumper of the vehicle thereon. A slide channel is slidably received within each fixed channel for relative sliding movement therebetween in the lateral direction. Guard material is suspended from the slide channel to be arranged for catching debris thrown rearward from wheels of the vehicle. The guard material and the slide channel are arranged to be slidably removable together from the fixed channel while the fixed channel can remain secured to the vehicle at spaced positions along the vehicle to take advantage of both supporting the guard material along the full width of the vehicle in a stable manner while also permitting the guard material to be readily slidably removed from the vehicle when not in use.

19 Claims, 5 Drawing Sheets

MUD GUARD ASSEMBLY

FIELD OF THE INVENTION

The present invention relates to a mud guard assembly for catching debris thrown rearwardly from wheels of a vehicle, and more particularly relates to a mud guard assembly for use with a towing vehicle to protect a trailer being towed from rearward thrown debris.

BACKGROUND

Mud guards are well known for guarding against various road debris thrown rearwardly from the wheels of a vehicle by being positioned rearwardly of the wheels to catch the thrown debris. On towing vehicles in particular it is desirable to provide mud guards, otherwise known as tow guards or tow flaps and the like, which extend substantially the full width of the vehicle to catch the debris being thrown rearward towards a towed object to in turn protect the towed object.

U.S. Pat. No. 6,394,475 belonging to Simon, U.S. Pat. No. 6,485,059 belonging to Burnstein and U.S. Pat. No. 6,955,369 belonging to Schiebout et al. disclose various examples of mud flap assemblies which are supported on the hitch of the towing vehicle for ease of removal when not in use. Such designs however when only supported centrally on the towing vehicle hitch are largely unstable and have the potential to rock or be displaced about when the vehicle is in motion. Typically designs include a supporting frame which spans the fully width of the vehicle which is substantially supported only on the hitch so that even when removed, a large awkward frame is required to be stored. Due to the awkward sizes of typical frames and the mounting thereof on the hitch, positioning the mud guards or mud flaps is typically awkward. Furthermore such assemblies are only useful when supported on vehicles having a hitch at the rear bumper, however such assemblies cannot be supported on vehicles that do not have a rear bumper hitch and instead rely on a fifth wheel hitch for example.

Other designs of mud flaps which are not supported on the hitch of the vehicle typically require substantial mounting onto the vehicle with numerous threaded fasteners so that it is subsequently difficult to remove the mud guards when no longer towing an object.

SUMMARY OF THE INVENTION

According to one aspect of the invention there is provided a mud guard assembly for a vehicle having a chassis supported for longitudinal travel in a forward direction, the assembly comprising:

at least one fixed channel arranged to be supported in fixed relation to the chassis of the vehicle at a rear of the vehicle to extend laterally in relation to the longitudinal travel of the vehicle;

said at least one fixed channel being arranged to be supported on the chassis of the vehicle at a plurality of positions along a length of the fixed channel which are spaced in a lateral direction relative to one another;

a slide channel arranged to be supported along said at least one fixed channel for sliding movement relative to said at least one fixed channel in the lateral direction; and guard material suspended from the slide channel and arranged for catching debris thrown rearward from wheels of the vehicle;

the slide channel and the guard material of said at least one fixed channel being arranged to be slidably removable together from the fixed channel by sliding the slide channel relative to the fixed channel in the lateral direction.

By providing a first channel which is fixed along the vehicle and a second channel receiving the guard material therein which is slidably mounted on the fixed channel, the fixed channel can be supported at plural spaced positions along the vehicle to be supported in a stable condition, while still permitting the guard material to be readily removed when not in use by simply leaving the fixed channel in place and removing the slidable channel therefrom. Furthermore the slide channels can be formed in sections to provide for easier storage when removed. Accordingly the mud guard assembly in accordance with the present invention is both stably supported on the vehicle while also being readily removed therefrom when not in use.

The fixed channel is preferably arranged to be supported on the chassis of the vehicle at opposing ends of the fixed channel at a plurality of positions spaced in the lateral direction on the vehicle.

The fixed channel may be arranged to be mounted to existing fasteners of the vehicle, for example fasteners which support a rear bumper of the vehicle on the vehicle chassis.

When the fixed channel is supported by a pair of brackets spaced apart from one another fixed on the chassis of the vehicle and the fixed channel is supported for sliding movement in the lateral direction relative to the brackets, fasteners are preferably arranged to selectively secure position of the fixed channel in relation to the bracket.

The fixed channel may include a bottom track slidably receiving the slide channel at a bottom side thereof, a top track in a top side thereof which slidably receives a portion of the two brackets therein, and/or a rear track in a rear side of the fixed channel which is arranged to slidably receive a portion of the two brackets therein.

The bottom track of the fixed channel may comprise a keyway slidably receiving a mating portion of the slide channel therein. The keyway preferably comprises a pair of depending portions which confront one another and which extend inwardly towards one another to retain a portion of the slide channel within the keyway and which are arranged to receive the guard material extending downwardly therebetween.

Preferably there is provided a clevis pin slidable through cooperating apertures in said at least one fixed channel and the slide channel slidably received therein in which the clevis pin is arranged to be inserted perpendicularly to the lateral direction of relative sliding.

In the illustrated embodiment, the fixed channel is arranged to terminate at an outer end which is spaced inwardly in relation to a side of the vehicle while the slide channel of said at least one fixed channel is arranged to extend outward to an outer end which extends beyond a side of the vehicle so as to be wider than the fixed channel in the lateral direction.

The slide channel may comprise a head and two depending flanges depending downwardly from the head so as to be suitably spaced apart narrower than a width of the head in which the depending flanges securably receive the guard material therebetween using fasteners extending through the flanges and the guard material.

The fixed channel may further comprise depending portions depending downwardly from the respective retainer portions so as to conceal the slide channel within the fixed channel.

Both the fixed channel and the slide channel preferably comprise an extruded channel member.

The guard material preferably comprises a panel of rubber material which includes a plurality of slots extending upwardly from a bottom edge of the panel partway across the panel at spaced positions along a length of the panel.

In one embodiment, two fixed channels are arranged to be supported on opposing sides of a hitch of the vehicle to span from the hitch to a respective side of the vehicle. Alternatively when the vehicle does not require use of a hitch at the rear bumper, the fixed channel may be arranged to span fully across a full width of the vehicle between opposing sides thereof to suspend guard material spanning a full width of the vehicle.

One embodiment of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Referring to the accompanying figures there is illustrated a mud guard assembly generally indicated by reference numeral 10. The mud guard assembly is suited for being supported on a vehicle 12 to guard against debris being thrown rearwardly from the rear wheels of the vehicle. The assembly 10 is particularly suited for a towing vehicle of the type having a hitch 14 for towing a trailer, towed vehicle or other towed object so as to protect the towed object from the debris thrown rearward from the towing vehicle.

In the illustrated embodiment, the mud guard assembly 10 is suited for a vehicle 12 supported for travel in a longitudinal forward direction and including a rear bumper 16 supported on chassis mounts 18 to mount the bumper onto the vehicle chassis using existing fasteners of the vehicle at a rear end of the vehicle.

The assembly 10 generally comprises a fixed channel 20 which is arranged to remain attached to the vehicle in fixed relation to the chassis mounts 18, and guard material 22 arranged to be removable supported on the fixed channel 20 to be suspended therefrom in use for guarding against debris being thrown rearwardly from the vehicle.

Referring to FIGS. 1 through 7 initially, a first embodiment of the assembly 10 will now be described in further detail. The fixed channel in this instance comprises two separate channels 20 which are each comprised of rigid extruded metal. The two fixed channels are supported spaced apart from one another by sufficient space to accommodate the hitch 14 of the vehicle therebetween. Each channel extends laterally outwardly in relation to the longitudinal travel direction of the vehicle from the proximity of the hitch 14 at an inner end to an outer end which terminates short of the side of the vehicle so as not to project laterally outward beyond the vehicle.

The fixed channels have a cross section which defines a bottom track 24, a top track 26 and a rear track 28, each of which extend the full length of the channel. The bottom track 24 is arranged to slidably receive a slide channel 30 therein from which the guard material 22 is suspended from the bottom side of the fixed channel when mounted in place on a vehicle.

The top track 26 is located on the opposing top side of the channel in relation to the bottom track and comprises a suitable keyway for cooperating with components to mount the channel to the chassis mounts of the vehicle in certain embodiments. The rear track 28 comprises a keyway similar to top track 26 also for mating with components to attach the fixed channel to the chassis mounts of the vehicle in certain applications.

Each of the top track 26 and the rear track 28 comprise a rectangular recessed portion which matingly received a bolt head 32 therein, for example a hexagonal head so that any two opposing flat sides of the bolt head are suitably spaced to fit within opposing side walls of the rectangular channel of the respective top and rear tracks.

In addition to the rectangular channel 34, each of the top and rear tracks includes a pair of confronting retainer flanges 36 at the open mouth of the rectangular channel which are oriented to project inwardly towards one another to narrow the mouth opening of the rectangular channel and thereby retain the bolt head 32 within the rectangular portion of the channel. The stem 38 of the bolt projects through the mouth between the confronting retainer flanges 36 so that the bolt head can be slidably displaced within the rectangular channel 34 along the length of the top track or rear track which in turn permits sliding along the length of the fixed channel 20. The close fit of the opposing flat sides of the bolt head within the rectangular channel 34 of the top and rear tracks prevents rotation of the bolt about its respective axis of rotation while it is permitted to be slideable along the length of the track.

The rear track 28 in the illustrated embodiment includes an additional recess 40 which is narrower than the rectangular channel 34 and which is in alignment with the mouth between the retainer flanges 36 to permit a nut to be received in the rectangular channel 34 instead of a bolt head while providing space for a bolt to be threaded through the nut beyond the rectangular channel and into the recess 40.

For mounting the fixed channels onto the vehicle, two mounting brackets 42 are provided which are supported on the fixed channel spaced apart from one another at opposing ends of the channel so as to support the fixed channel on the vehicle chassis at laterally spaced apart positions on the channel and on the vehicle. The fasteners received in either of the top or rear tracks 26 or 28 are secured to the bracket 42 which is in turn secured to an existing fastener of the vehicle which secures the rear bumper 16 to chassis mounts 18 of the vehicle chassis.

Figure 5:
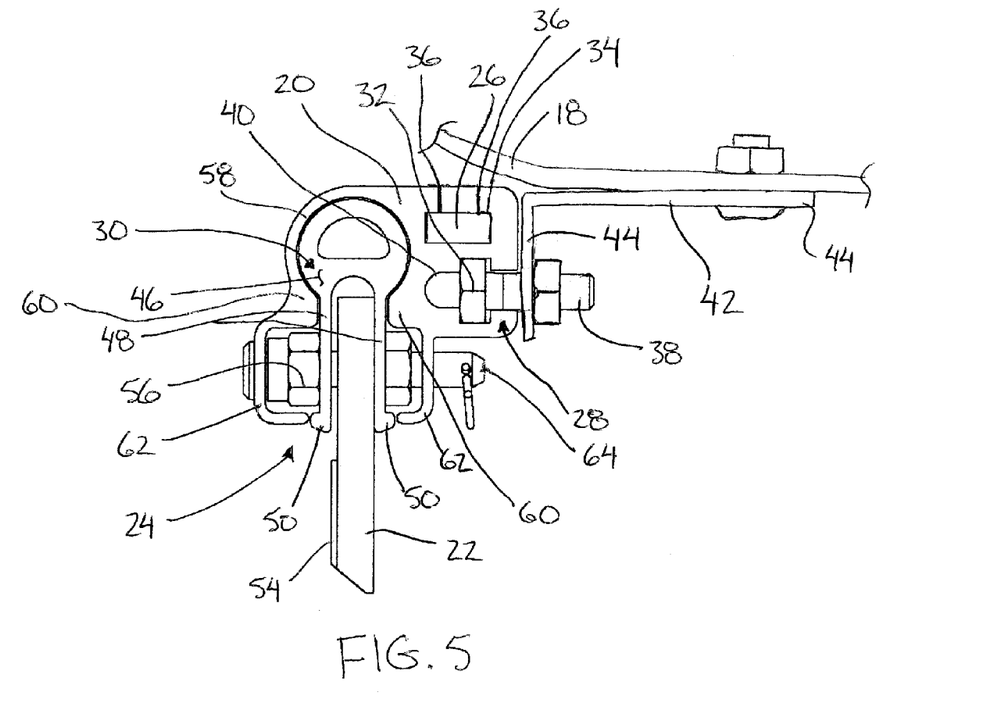
FIG. 5 is a sectional view of the channels shown mounted on the bumper mounts of the vehicle.
Figure 6:
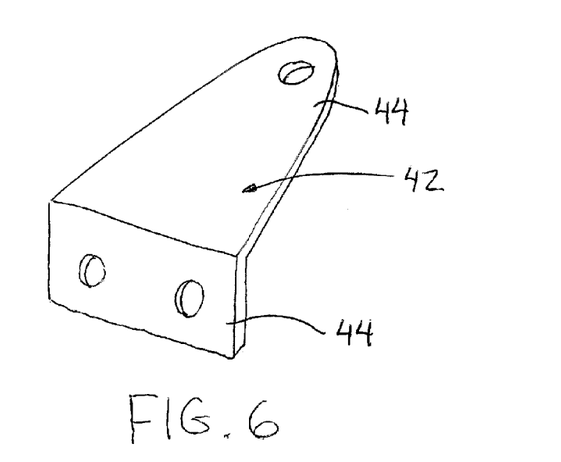
FIG. 6 is a perspective view of one of the brackets for mounting the fixed channel onto the chassis of the vehicle.

As shown in the embodiment of FIG. 5, each bracket comprises a pair of perpendicular mounting flanges 44 locating a first fastener aperture in one of the flanges at a free end thereof for securement to the existing bumper mounting fastener of the vehicle while a pair of apertures are located in the other flange adjacent the free end thereof for receiving a pair of laterally spaced fasteners received in the rear track 28 of the fixed channels. In this embodiment the brackets can be mounted at numerous positions on the vehicle while remaining slidable along the rear track 28 of the fixed channel until desired positions on the vehicle are selected at which point the fixed channel is laterally positioned by laterally sliding relative to the brackets until a desired position of the fixed channel is reached. At this point the fasteners in the bracket are tightened to prevent further relative sliding between the fixed channel and the brackets 42 so that the fixed channel then remains fixed in relation to the vehicle chassis. The fixed channel once installed can permanently remain in an installed position supported just below the rear bumper of the vehicle.

Figure 7:
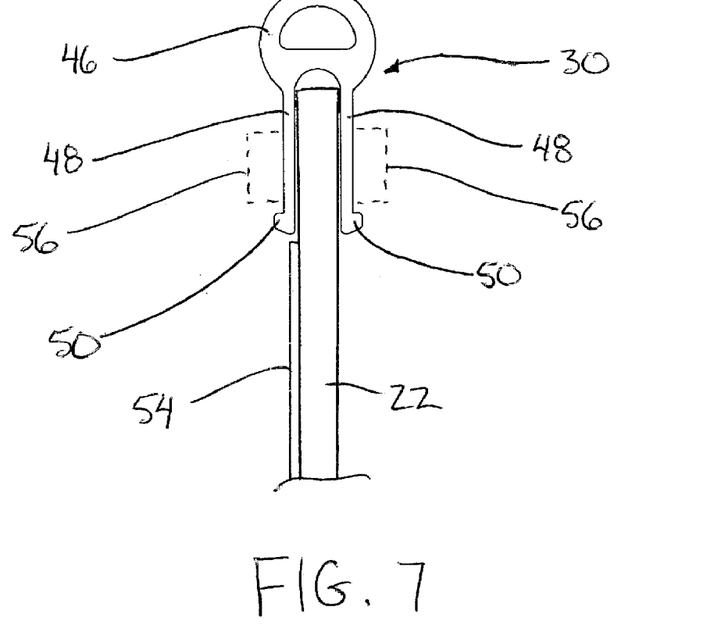
FIG. 7 is an end elevational view of the slide channel with the guard material shown suspended therefrom.

The slide channel 30 received in the bottom track of the fixed channel also comprises a rigid extruded metal piece having a continuous cross section along the length thereof. The cross section includes a round head 46 which is partially hollowed out to reduce weight and use of material. Two depending flanges 48 extend downward from the round head 46 such that the depending flanges 48 are parallel and spaced apart from one another by an overall spacing that is narrower than the head 46 thereabove. Ribs 50 are formed along outer sides of the depending flanges at the bottom free edges thereof.

The guard material 22 comprises rubber like panels having a length which spans substantially the full length of the slide channel 30, which in turn spans substantially the full length or greater than the respective fixed channel upon which it is supported. Height of the panel forming the guard material 22 is suitable to span a substantial portion of the distance from the vehicle bumper to the ground. A plurality of slots 52 are vertically positioned to extend upward from the bottom edge of the panel most of the way to the top edge to permit individual sections of the panel to flex relative to other sections.

A reinforcing plate 54 of much narrower height then the panel of guard material 22 spans laterally the full length of the guard material in the lateral direction adjacent the top edge of the material. Suitable fasteners secure the reinforcing plate to the rubber of the guard material 22. The reinforcement plate 54 comprises metal or other suitable material upon which a logo can be displayed.

A top edge of the panel of guard material 22 is inserted between the depending flanges 48 along the full length of the slide channel 30 and secured therein by suitable fasteners 56 which extend through cooperating apertures in the guard material 22 and the depending flanges 48 to effectively clamp the guard material between the depending flanges 48 when the fasteners are tightened. The guard material 22 is arranged to be secured to the slide channel 30 so that it remains attached to the channel as it is both slidably attached and slidably removed in relation to the fixed channel on the vehicle.

The bottom track 24 of the fixed channel 20 includes a rounded recess 58 at the innermost portion of the track which is suitably sized and dimensioned for mating engagement with the rounded head 46 of the slide channel matingly received therein. The bottom track further includes retainer portions 60 at the mouth of the round recess 58 which project inwardly sufficiently to retain the head 46 of the slide channel within the round recess 58 while permitting relative sliding movement therebetween in a lateral direction of the vehicle and in a lengthwise or longitudinal direction of the channels. The retainer portions 60 extend inwardly towards one another while maintaining a gap therebetween at the free ends of the retainer portions for receiving the depending flanges 48 and guard material 22 of the slide channel depending therethrough.

The bottom track further includes depending portions 62 located on each side of the mouth of the round recess 58. The depending portions 62 are spaced wider apart than the retainer portions 60 thereabove. The depending portions 62 extend downwardly a height which corresponds approximately to a height that the depending flanges 48 extend from the round head 46 of the slide channel so that the depending portions 62 of the fixed channel fully conceal the slide channel within the bottom track of the fixed channel.

The depending portions 62 of the bottom track of fixed channel are spaced apart wide enough to accommodate the depending flanges 48 of the slide channel and the guard material therebetween as well as the fasteners 56 projecting from opposing sides of the depending flanges 48 which serve to secure the guard material within the depending flanges. Free ends of the depending portions 62 at the bottom thereof extend inwardly towards one another below the fasteners 56 on the depending flanges 48 of the slide channel to further conceal the slide channel within the fixed channel and protect the fasteners 56 from road debris and corrosion and the like. The free ends of the depending portions 62 meet the ribs 50 along the free edges of the depending flanges 48 of the slide channel in a longitudinally extending seam extending the length of the channels so that the close relationship between the depending flanges and the depending portions of the fixed channel prevents debris from entering into the bottom track and interfering with relative sliding movement between the slide channel and the fixed channel.

Cooperating apertures are provided at spaced positions along the depending flanges 48 of the slide channel and the depending portions 62 of the fixed channel for receiving respective clevis pins 64 at one or more positions along the length of each fixed channel in which the pins 64 are inserted through the channels perpendicularly to the direction of relative sliding movement therebetween. The clevis pins 64 are secured in the usual manner with a retainer clip when mounted in use.

Figure 1:
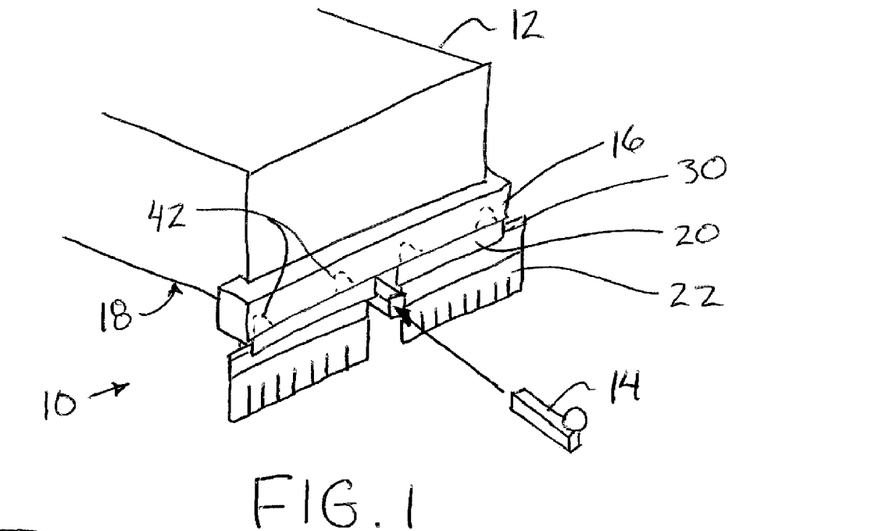
FIG. 1 is a perspective view of a first embodiment of the mud guard assembly.
Figure 2:
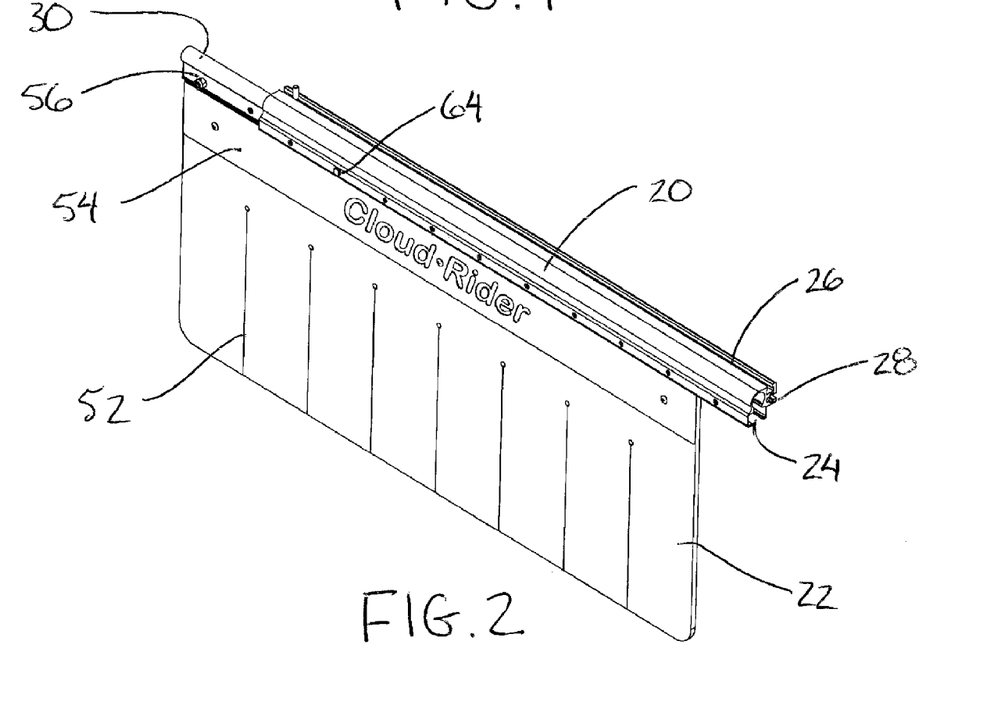
FIG. 2 is a perspective view of one section of the mud guard assembly shown removed from the vehicle.
Figure 3:
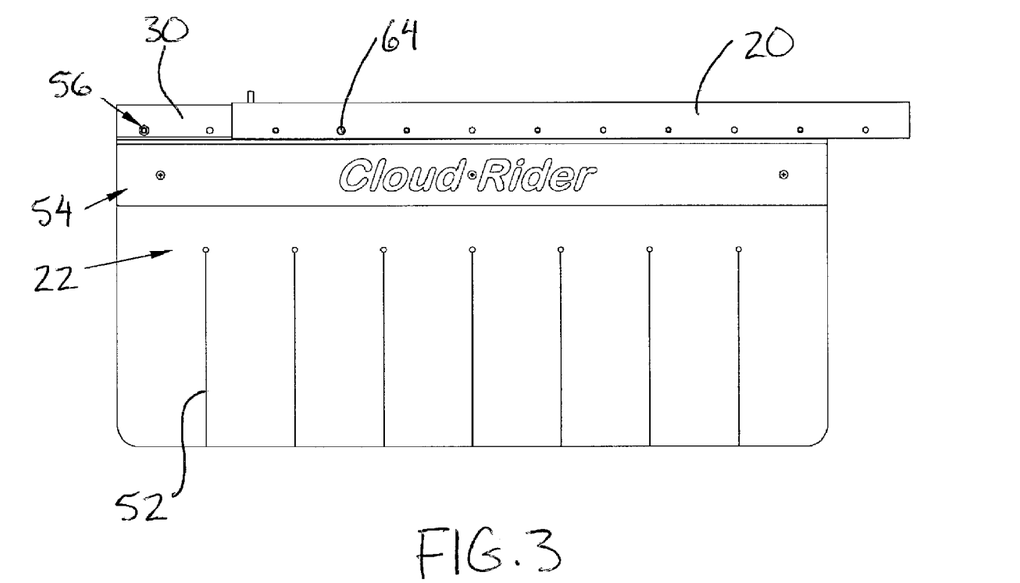
FIG. 3 and FIG. 4 are rear elevational and top plan views of the section of the mud guard assembly according to FIG. 2.
Figure 4:
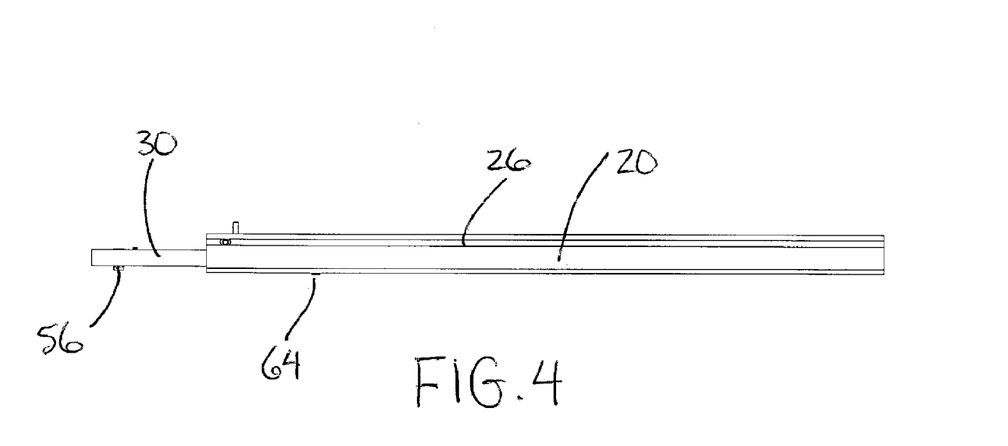

In the mounted position, the slide channel 30 and guard material 22 suspended therefrom are arranged to be longer in the lateral direction of the vehicle than the fixed channels so that respective outer ends of the slide channels 30 and guard material 22 extend laterally outwardly in relation to the vehicle at least a width of the vehicle and in the illustrated embodiment extend outwardly past the sides of the vehicle to fully ensure that substantially all road debris thrown rearwardly from the vehicle is prevented from being thrown at a towed object behind the vehicle.

Figure 8:
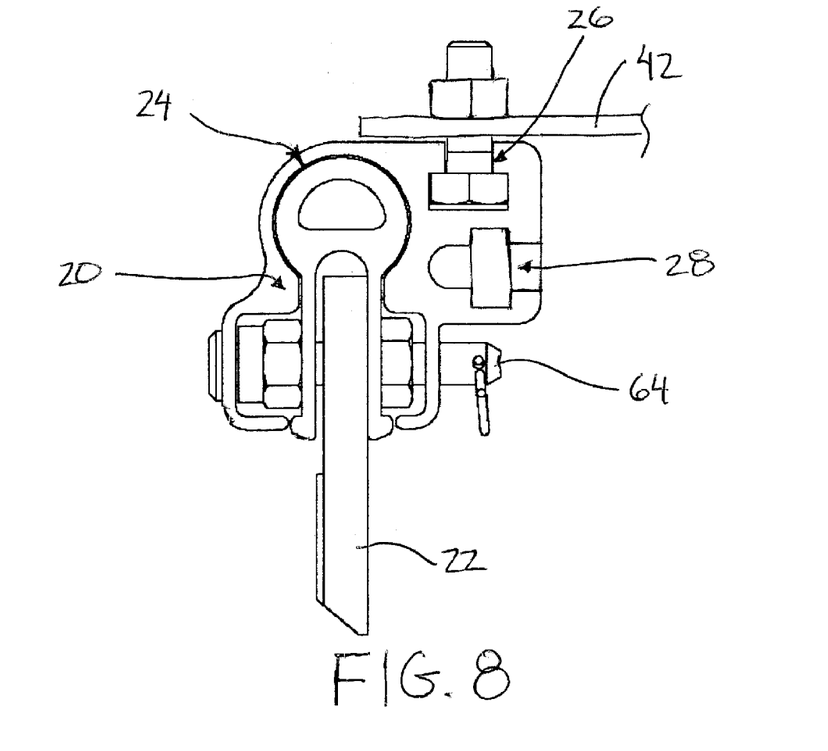
FIG. 8 is an end view of a second embodiment of the brackets for mounting the fixed channel onto the vehicle chassis.

Turning now to FIG. 8, in a further embodiment the brackets 42 can be mounted using fasteners received in the top track 26 instead of the rear track 28 for mounting to chassis mounts 18 on the vehicle which are of a different configuration. The sliding adjustment of the fixed channels relative to the brackets and subsequent fixed mounting relationship therebetween once a desired position is reached is otherwise identical to the previous embodiment.

Figure 9:
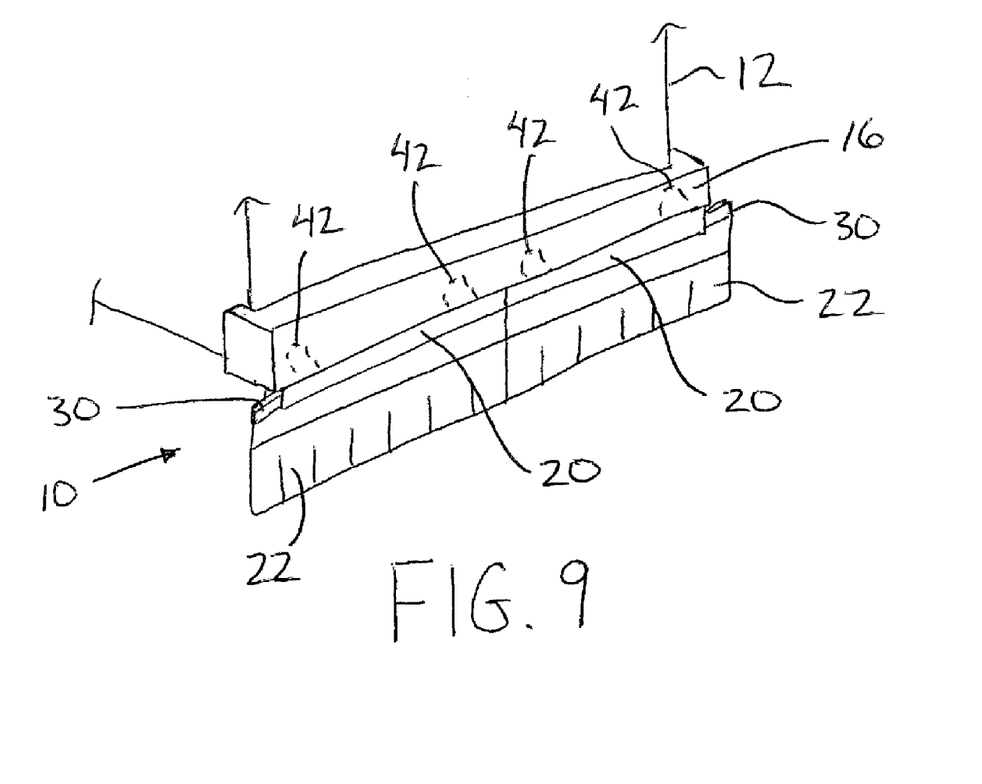
FIG. 9 is a perspective view of an alternative application for installation of the mud guard assembly.

As shown in FIG. 9, the fixed channel 20 may be arranged to span substantially the full width of the vehicle when no space is required centrally on the vehicle to accommodate for a hitch mounted at the rear bumper of the vehicle. In embodiments where the vehicle comprises a recreational vehicle for example or a towing vehicle using a fifth wheel hitch, the fixed channel may comprise a single channel spanning the full width of the vehicle or it may be formed in sections abutted with one another to substantially span the full width of the vehicle. In this instance the slide channel 30 and guard material 22 suspended therefrom similarly span the full width of the vehicle, preferably in sections for ease of storage when removed from the vehicle.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A mud guard assembly for a vehicle having a chassis supported for longitudinal travel in a forward direction, the assembly comprising:
   at least one fixed channel arranged to be supported in fixed relation to the chassis of the vehicle at a rear of the vehicle to extend laterally in relation to the longitudinal travel of the vehicle;
   said at least one fixed channel being arranged to be supported on the chassis of the vehicle at a plurality of positions along a length of the fixed channel which are spaced in a lateral direction relative to one another;
   a slide channel arranged to be supported along said at least one fixed channel for sliding movement relative to said at least one fixed channel in the lateral direction;
   guard material suspended from the slide channel and arranged for catching debris thrown rearward from wheels of the vehicle;
   the slide channel and the guard material of said at least one fixed channel being arranged to be slidably removable together from the fixed channel by sliding the slide channel relative to the fixed channel in the lateral direction;
   said at least one fixed channel being supported by a pair of brackets spaced apart from one another fixed on the chassis of the vehicle,
   the fixed channel being supported for sliding movement in the lateral direction relative to the brackets;
   a plurality of fasteners arranged to selectively secure position of the fixed channel in relation to the brackets; and
   a clevis pin slidable through cooperating apertures in said at least one fixed channel and the slide channel slidably received therein in which the clevis pin is arranged to be inserted perpendicularly to the lateral direction of relative sliding.

2. The assembly according to claim 1 wherein said at least one fixed channel is arranged to be supported on the chassis of the vehicle at opposing ends of the fixed channel.

3. The assembly according to claim 1 wherein said at least one fixed channel is arranged to be supported on the chassis of the vehicle at a plurality of positions spaced in the lateral direction on the vehicle.

4. The mud guard assembly according to claim 1 wherein said at least one fixed channel is arranged to be mounted to existing fasteners of the vehicle comprising fasteners which support a rear bumper of the vehicle on the vehicle chassis.

5. The assembly according to claim 1 wherein said at least one fixed channel includes a keyway slidably receiving a mating portion of the slide channel therein, the keyway comprising a pair of depending portions which confront one another and which extend inwardly towards one another to retain a portion of the slide channel within the keyway and which are arranged to receive the guard material extending downwardly therebetween.

6. The assembly according to claim 1 wherein said at least one fixed channel is arranged to terminate at an outer end which is spaced inwardly in relation to a side of the vehicle.

7. The assembly according to claim 1 wherein the slide channel of said at least one fixed channel comprises a head and two depending flanges depending downwardly from the head so as to be suitably spaced apart narrower than a width of the head, the depending flanges receiving the guard material therebetween.

8. The assembly according to claim 1 wherein said at least one fixed channel comprises an extruded channel member.

9. The assembly according to claim 1 wherein the slide channel of said at least one fixed channel comprises an extruded channel member.

10. The assembly according to claim 1 wherein the guard material comprises a panel of rubber material.

11. The assembly according to claim 1 wherein said at least one fixed channel comprises two fixed channels arranged to be supported on opposing sides of a hitch of the vehicle to span from the hitch to a respective side of the vehicle.

12. The assembly according to claim 1 wherein said at least one fixed channel is arranged to span fully across a full width of the vehicle between opposing sides thereof to suspend guard material spanning a full width of the vehicle.

13. A mud guard assembly for a vehicle having a chassis supported for longitudinal travel in a forward direction, the assembly comprising:
   at least one fixed channel arranged to be supported in fixed relation to the chassis of the vehicle at a rear of the vehicle to extend laterally in relation to the longitudinal travel of the vehicle;
   said at least one fixed channel being arranged to be supported on the chassis of the vehicle at a plurality of positions along a length of the fixed channel which are spaced in a lateral direction relative to one another;
   a slide channel arranged to be supported along said at least one fixed channel for sliding movement relative to said at least one fixed channel in the lateral direction;
   guard material suspended from the slide channel and arranged for catching debris thrown rearward from wheels of the vehicle;
   the slide channel and the guard material of said at least one fixed channel being arranged to be slidably removable together from the fixed channel by sliding the slide channel relative to the fixed channel in the lateral direction;
   said at least one fixed channel being supported by a pair of brackets spaced apart from one another fixed on the chassis of the vehicle;
   the fixed channel being supported for sliding movement in the lateral direction relative to the brackets; and
   a plurality of fasteners arranged to selectively secure position of the fixed channel in relation to the brackets;
   wherein the fixed channel includes a bottom track slidably receiving the slide channel at a bottom side thereof and a top track in a top side thereof which slidably receives a portion of the two brackets therein.

14. A mud guard assembly for a vehicle having a chassis supported for longitudinal travel in a forward direction, the assembly comprising:
   at least one fixed channel arranged to be supported in fixed relation to the chassis of the vehicle at a rear of the vehicle to extend laterally in relation to the longitudinal travel of the vehicle;
   said at least one fixed channel being arranged to be supported on the chassis of the vehicle at a plurality of positions along a length of the fixed channel which are spaced in a lateral direction relative to one another;
   a slide channel arranged to be supported along said at least one fixed channel for sliding movement relative to said at least one fixed channel in the lateral direction;
   guard material suspended from the slide channel and arranged for catching debris thrown rearward from wheels of the vehicle;
   the slide channel and the guard material of said at least one fixed channel being arranged to be slidably removable together from the fixed channel by sliding the slide channel relative to the fixed channel in the lateral direction;

said at least one fixed channel being supported by a pair of brackets spaced apart from one another fixed on the chassis of the vehicle, the fixed channel being supported for sliding movement in the lateral direction relative to the brackets; and a plurality of fasteners arranged to selectively secure position of the fixed channel in relation to the brackets;

wherein the fixed channel comprises a bottom track arranged to slidably receive the slide channel therein and a rear track in a rear side of the fixed channel which is arranged to slidably receive a portion of the two brackets therein.

15. The assembly according to claim 13 wherein said at least one fixed channel includes another track in addition to the bottom track and the top track which is arranged to slidably receive a portion of the brackets therein.

16. The assembly according to claim 14 wherein said at least one fixed channel includes another track In addition to the bottom track and the rear track which is arranged to slidably receive a portion of the brackets therein.

17. The assembly according to claim 6 wherein the slide channel of said at least one fixed channel is arranged to extend outward to an outer end which extends beyond a side of the vehicle so as to be wider than the fixed channel in the lateral direction.

18. The assembly according to claim 7 wherein the guard material is secured between the two depending flanges of the slide channel by fasteners received through cooperating apertures in the depending flanges and the guard material and wherein said at least one fixed channel comprises a track having retainer portions arranged to restrict removal of the head of the slide channel while permitting sliding movement along a length of the channel and depending portions depending downwardly from the retainer portion so as to conceal the slide channel within the fixed channel.

19. The assembly according to claim 10 wherein the panel includes a plurality of slots extending upwardly from a bottom edge of the panel partway across the panel at spaced positions along a length of the panel.

* * * * *